(12) United States Patent
Scag et al.

(10) Patent No.: US 6,308,503 B1
(45) Date of Patent: Oct. 30, 2001

(54) CONVERTIBLE WIDTH LAWN MOWER

(75) Inventors: Dane T. Scag, Elm Grove, WI (US); Mark C. Bland, New Albany, IN (US)

(73) Assignee: Great Dane Power Equipment, Inc., Elm Grove, WI (US)

( * ) Notice: Subject to any disclaimer, the term of this patent is extended or adjusted under 35 U.S.C. 154(b) by 0 days.

(21) Appl. No.: 09/607,298

(22) Filed: Jun. 30, 2000

(51) Int. Cl.$^7$ .................................................... A01D 34/66
(52) U.S. Cl. ................................ 56/6; 56/16.9; 56/320.2
(58) Field of Search .............................. 56/6, 11.9, 13.5, 56/13.6, 14.7, 15.8, 16.9, 320.1, 320.2, DIG. 9, DIG. 10

(56) References Cited

U.S. PATENT DOCUMENTS

| | | |
|---|---|---|
| 3,736,735 | 6/1973 | Kulak et al. . |
| 4,858,417 | 8/1989 | Priefert et al. . |
| 5,177,942 * | 1/1993 | Hager et al. ............................ 56/11.6 |
| 5,241,808 * | 9/1993 | Colistro ....................................... 56/6 |
| 5,249,411 | 10/1993 | Hake . |
| 5,280,695 * | 1/1994 | Nunes, Jr. et al. ......................... 56/6 |
| 5,463,853 | 11/1995 | Santoli et al. . |
| 5,771,669 * | 6/1998 | Langworthy et al. ..................... 56/6 |
| 6,000,202 | 12/1999 | Laskowski . |

* cited by examiner

Primary Examiner—Robert E. Pezzuto
(74) Attorney, Agent, or Firm—William K. Baxter; Godfrey & Kahn, S.C.

(57) ABSTRACT

A self-propelled, walk-behind commercial type lawn mower having a frame with a mower deck attached to a front section of the frame, an engine mounted to a rear section of the frame, and a handle bar assembly attached to and extending rearwardly and upwardly from the rear section of the frame. The mower deck includes at least one rotatable wing section pivotally attached to the frame of the mower deck for movement between a substantially horizontal operating position and a substantially vertical non-operating position. The rotatable wing section extends the mowing width of the mower deck and allows mower to travel through narrow passageways of an enclosed mowing area. A locking mechanism secures the wing section in its substantially horizontal operating position and a substantially vertical non-operating position. A rotatable caster wheel attached to the front of the wing section may be retracted to provide maximum clearance when the wing section is in its vertical position.

20 Claims, 4 Drawing Sheets

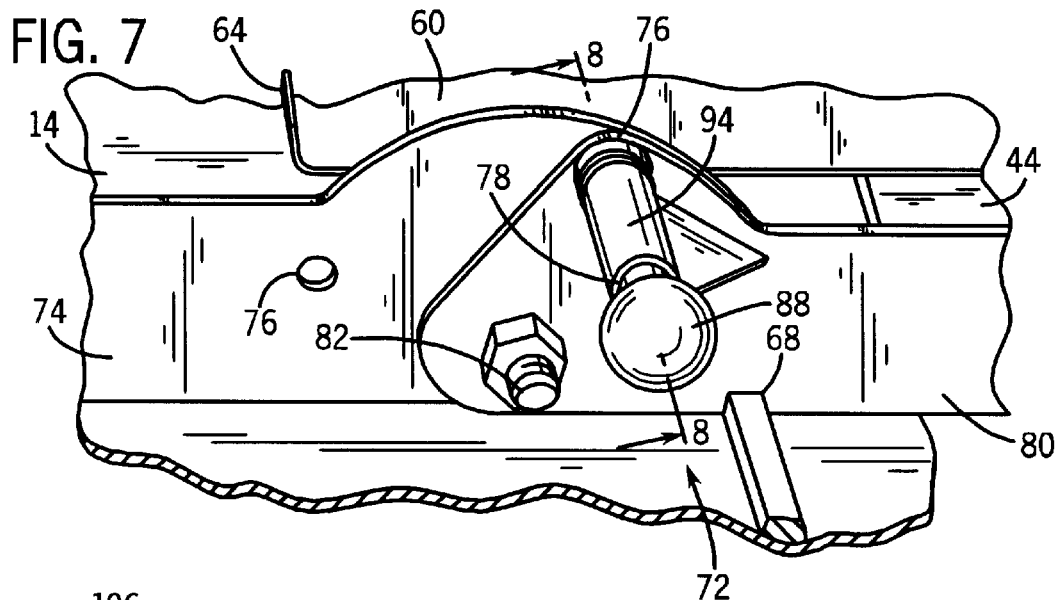
FIG. 7
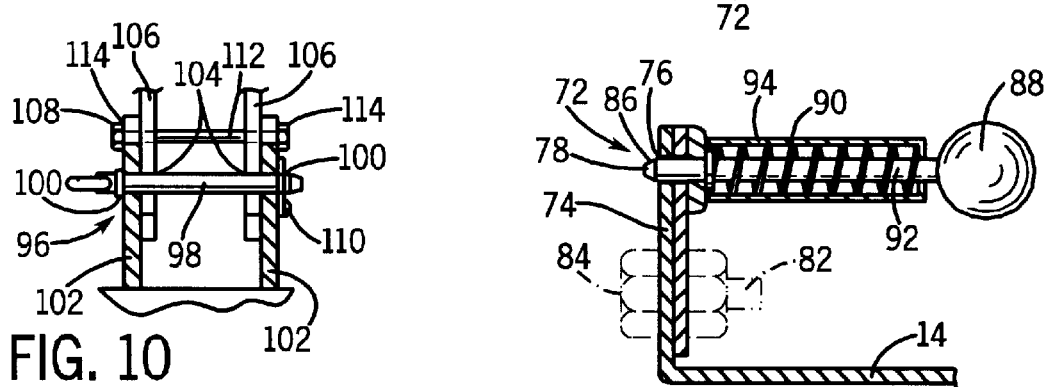
FIG. 10
FIG. 8
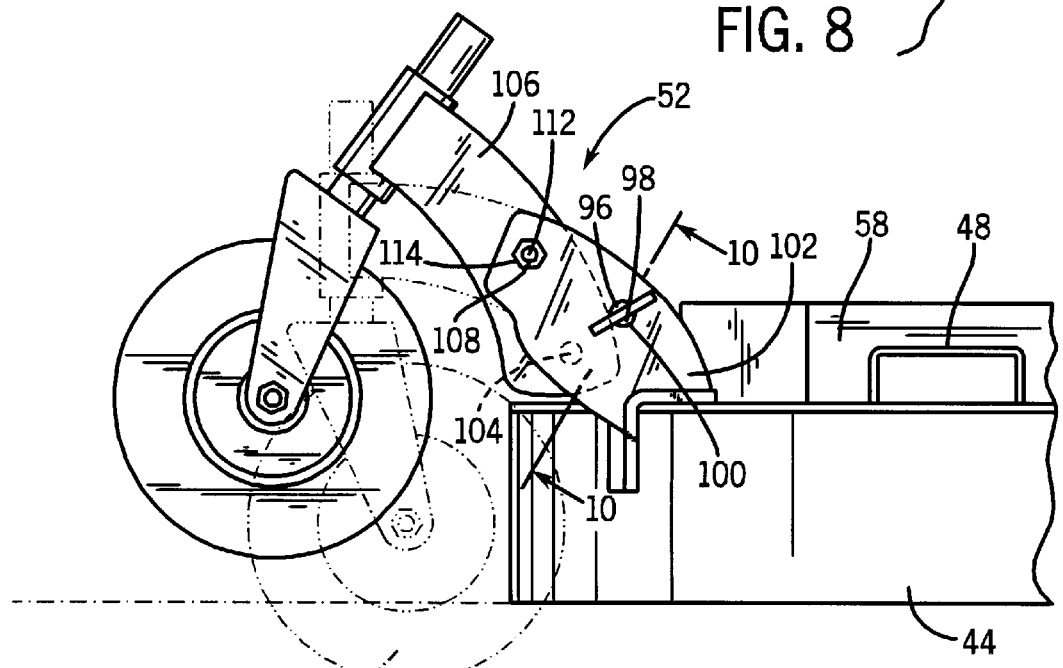
FIG. 9

CONVERTIBLE WIDTH LAWN MOWER

BACKGROUND OF THE INVENTION

The present invention relates generally to lawn mowers, and more particularly to selfpropelled, walk-behind commercial type lawn mowers having a mower deck with a rotatable wing section pivotally attached to one side thereof for movement between a horizontal operating position and a vertical non-operating position.

Most current lawn mowers designed for commercial use are either dedicated walk-behind lawn mowers or conventional riding lawn mowers. Commercial type riding lawn mowers are generally quite large, heavy and difficult to maneuver around obstacles, such as trees and shrubs and the like. An example of such a riding lawn mower is shown in U.S. Pat. No. 4,809,796 to Yamaoka et al. Riding lawn mowers are also quite expensive to purchase and maintain. The substantial cost of purchasing and maintaining riding mowers has led many lawn mower service companies to rely more heavily on the use of lower cost, mid-size, walk-behind rotary mowers.

The walk-behind mowers are generally smaller, more maneuverable, and less expensive than riding mowers. Being self-powered, these mowers are capable of cutting large areas of grass. The walk-behind mowers are also relatively simple to operate, and inexpensive to purchase and maintain compared to riding lawn mowers. In addition, these mowers are generally safer and more useful in mowing steep hills. Furthermore, they are small enough to be easily stored and transported by commercial lawn mower service companies. One example of a self-powered, walk-behind mower is shown in U.S. Pat. No. 4,920,733 to Berrios.

Most prior art walk-behind lawn mowers typically include fixed width mower decks having widths of 32, 36, 48, 52 or 61 inches. In many applications it is desirable to have a mower which can cut a relatively wide path of grass in order to efficiently handle larger lawns and fields. A commercial landscaper would prefer to use the largest width mower deck in order to cut the grass in as short a time as possible. The cost and time of mowing can be substantially reduced by using a mower with a wide cutting path. However, many areas of grass are enclosed by a fence having only a narrow gate or passageway for entering and exiting the area. Therefore, a lawn mower having a relatively wide fixed width mower deck such as a 48, 52 or 61 inch deck will not fit through a narrow opening. In turn, only lawn mowers having smaller width mower decks, such as 32 or 36 inches will be able to be used in such areas. This will decrease mowing efficiency and increase the time for mowing fenced-in areas.

Accordingly, there is a need for an improved walk-behind lawn mower having a relatively wide mower deck with a rotatable wing section pivotally attached to one side thereof for movement between a horizontal operating position and a vertical non-operating position so that the mower may be used for mowing grass in enclosed areas.

SUMMARY OF THE INVENTION

Therefore, in view of the problems associated with the prior art lawn mowers, it is an object of the present invention to provide a lawn mower, which overcomes the drawbacks of the prior art. In particular, it is an object of the prior art to provide a lawn mower having a mower deck with a rotatable wing section pivotally attached to one side thereof for movement between a horizontal operating position and a vertical non-operating position, so that the mower may travel into and out of enclosed mowing areas. It is another object of the invention to provide a lawn mower having a rotatable caster wheel attached to the front of the rotatable wing section of the mower deck for movement between a operable ground engaging position and a non-operable swing-away position when the rotatable wing section is in a vertical non-operating position in order to provide adequate clearance for the wing section. Another object of the invention is to provide a lawn mower that includes a side cutting unit extending from at least one side of the mower deck to increase the cutting area of the mower.

These and other objects are met by the lawn mower of the present invention. The lawn mower comprises a frame and a mower deck with an engine mounted thereon. The engine provides power to a plurality of cutting blades mounted within the mower deck and to a pair of rear drive wheels. The frame includes a substantially horizontal front portion supporting the mower deck and engine, and a substantially vertical rear portion supporting a handle bar assembly with operator controls and an operator console mounted to the handle bar assembly.

The mower deck includes a rotatable wing section. The wing section may be rotated from a substantially horizontal operating position to a substantially vertical non-operating position for maneuvering the mower through narrow passageways such as through gates and the like. The wing section is raised only when the cutting blades are not being driven by the engine. A safety device or interlock is provided to prevent the cutting blades from being driven by the engine when the wing section is raised from its normal substantially horizontal position to its substantially upright transport position. Thus, the cutting blades are automatically disengaged from engine when raised from a mowing position to transport position.

A manually operated locking mechanism secures the rotatable wing section to the main mower deck. The locking mechanism includes an apertured frame member mounted to the top of the mower deck. The frame member includes at least two apertures formed therein for accepting a locking pin. The locking pin is mounted to a link member attached to the wing section. The link member is pivotally fastened to the frame member for rotation around a pivot point. The locking pin is spring biased for movement toward a pin-engaging position in the apertures of the frame member. As the wing section is raised into its vertical position, the biasing force of the spring urges the pin toward the surface of the frame member and into one of the apertures in the frame member.

Another feature of the invention is the swing-away front caster wheel located on the front of the wing section that allows the caster wheel to be rotated away from the bottom of the wing section for clearance purposes. Normally, the caster wheel extends down past the bottom of the wing section in a ground engaging position. When the wing section is rotated upwardly to its vertical position, the caster wheel still extends past the bottom of the deck. Thus, it is preferable for the caster wheel to be rotated out of the way to provide maximum clearance. The caster wheel attached to the front of the wing section is secured in place by a manual pin assembly.

When an operator is required to enter a mowing area through a narrow gate, the wing section is manually rotated upwardly and secured in a vertical position so that the effective width of the mower deck is no greater than the outside distance between the two rear drive wheels. Once inside the mowing area, the wing section is manually rotated downwardly and secured in a horizontal mowing position. Mowing with a large width mower deck is more efficient than mowing with narrow width mower deck lawn mowers.

Various other features, objects, and advantages of the invention will be made apparent to those skilled in the art from the accompanying drawings and detailed description thereof.

BRIEF DESCRIPTION OF THE DRAWINGS

FIG. 7 is a perspective view of a portion of the mower deck taken along line 7—7 of FIG. 3 showing a locking mechanism for securing the rotatable wing section in its operating and nonoperating positions;

FIG. 8 is a cross-sectional view of the locking mechanism taken along line 8—8 of FIG. 7;

FIG. 9 is a top plan view of a portion of the rotatable wing section taken along line 9—9 of FIG. 4 showing a rotatable caster wheel attached to the front of the wing section; and FIG. 10 is a cross-sectional view of a pin assembly taken along line 10—10 of FIG. 9 for securing the rotatable caster wheel in position.

DESCRIPTION OF PREFERRED EMBODIMENTS

The present invention is directed to a self-propelled, walk-behind lawn mower having a mower deck with at least one rotatable wing section pivotally attached to the frame of the mower deck. The wing section is rotatable from a substantially horizontal operating position to a substantially vertical non-operating position so that the mower may travel through narrow passageways of an enclosed mowing area. The wing section extends the width of the mower deck for mowing large parcels of land more efficiently.

Figure 1:
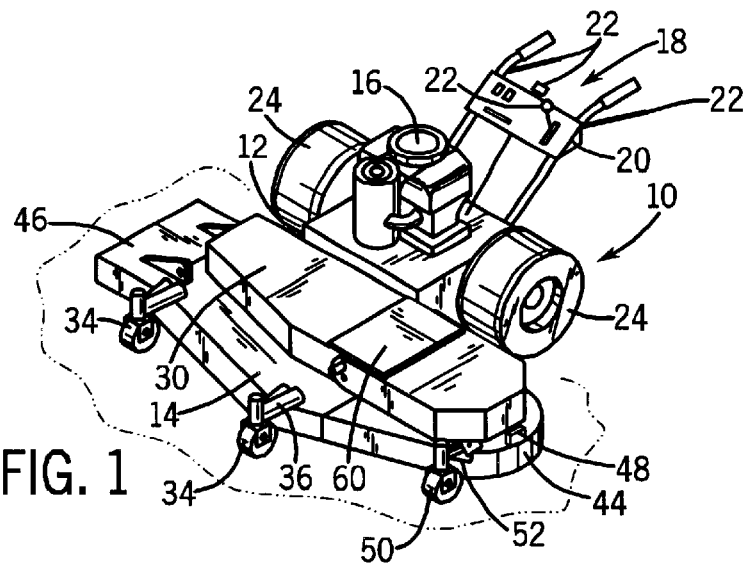
FIG. 1 is a perspective view of a self-propelled, walk-behind lawn mower having a mower deck with a rotatable wing section pivotally attached to one side thereof for movement between a horizontal operating position and a vertical non-operating position.

Referring first to FIG. 1, a lawn mower 10 is shown, constructed in accordance with a preferred embodiment of the present invention. The lawn mower 10 includes a rigid frame 12 with a mower deck 14 attached to a front section of the frame 12, an engine 16 mounted to a rear section of the frame 12, and a handle bar assembly 18 attached to and extending rearwardly and upwardly from the rear section of the frame 12 for controlling operation of the mower 10. The handle bar assembly 18 provides an operator control panel 20 with hand controls 22 for controlling operation of the engine, mower deck, and drive system of the mower.

The rear section of the frame 12 is supported by a pair of rear drive wheels 24 for propelling the mower forward or in reverse. Power is applied from the engine 16 to the rear drive wheels 24 through a hydrostatic drive system located in the rear section of the frame 12 under the engine 16. The drive shaft of the engine 16 is coupled to the hydrostatic drive system for driving the rear drive wheels 24.

Figure 6:
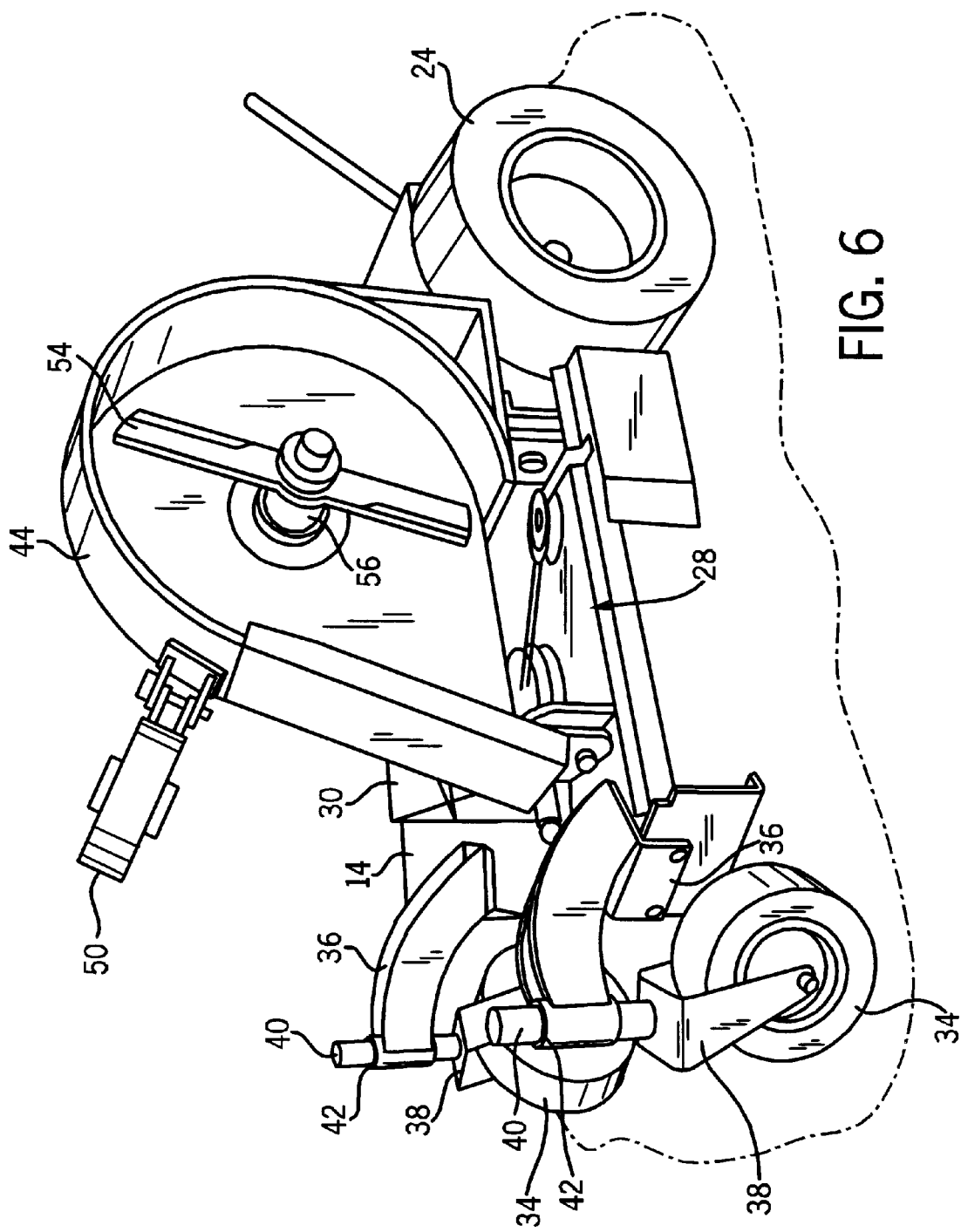
FIG. 6 is a perspective view of the lawn mower of FIG. 1 with the rotatable wing section in its vertical non-operating position.

The engine 16 also powers a plurality of cutting blades 26 housed within the mower deck 14 through a belt and pulley assembly 28, as generally shown in FIG. 6. The belt and pulley assembly 28 is coupled to the drive shaft of the engine 16 and extends under a cover assembly 30 located above the mower deck 14. The cutting blades 18 rotate in a horizontal plane on vertical shafts 32 coupled to the engine 16 by the belt and pulley assembly 28. At least two ground engaging caster wheels 34 support the front end of the mower 10. In the embodiments shown, the caster wheels 34 are mounted forward of the mower deck 14 by a bracket assembly 36 rigidly attached to the front of the mower deck 14. As seen best in FIG. 6, the caster wheels 34 are mounted on a bracket 38 having a post 40 extending upwardly therefrom which is inserted into and secured in a cylindrical opening 42 of the bracket assembly 36, allowing for pivotal rotation of the caster wheels 34 while the mower is turning.

In the present invention, the mower deck 14 includes at least one rotatable wing section 44 pivotally attached to at least one side the mower deck 14. In the embodiment shown, a single wing section 44 is pivotally attached to a side of the mower deck 14 opposite the cowling 46. The rotatable wing section 44 is manually raised and lowered by an operator grasping a handle 48 attached to the top surface of the wing section 44, preferably at the end of the wing section. The wing section 44 further includes at least one rotatable ground engaging caster wheel 50 for supporting the wing section 44. The caster wheel 50 is preferably mounted forward of the wing section 44 by a bracket assembly 52 rigidly attached to the front of the wing section 44.

Figure 2:
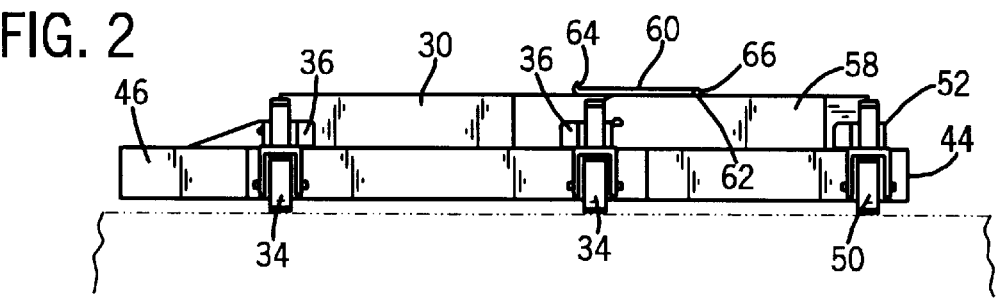
FIG. 2 is a front elevational view of the mower deck with the rotatable wing section in its horizontal operating position.
Figure 3:
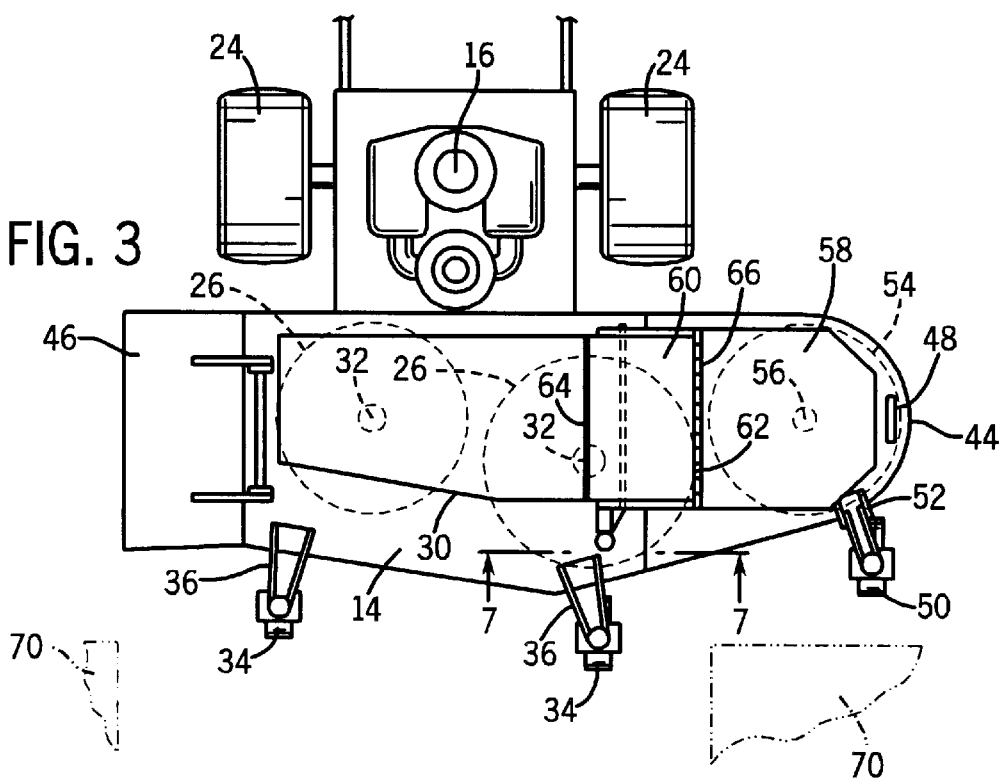
FIG. 3 is a top plan view of the lawn mower of FIG. 1 with the rotatable wing section of the mower deck in its horizontal operating position.
Figure 4:
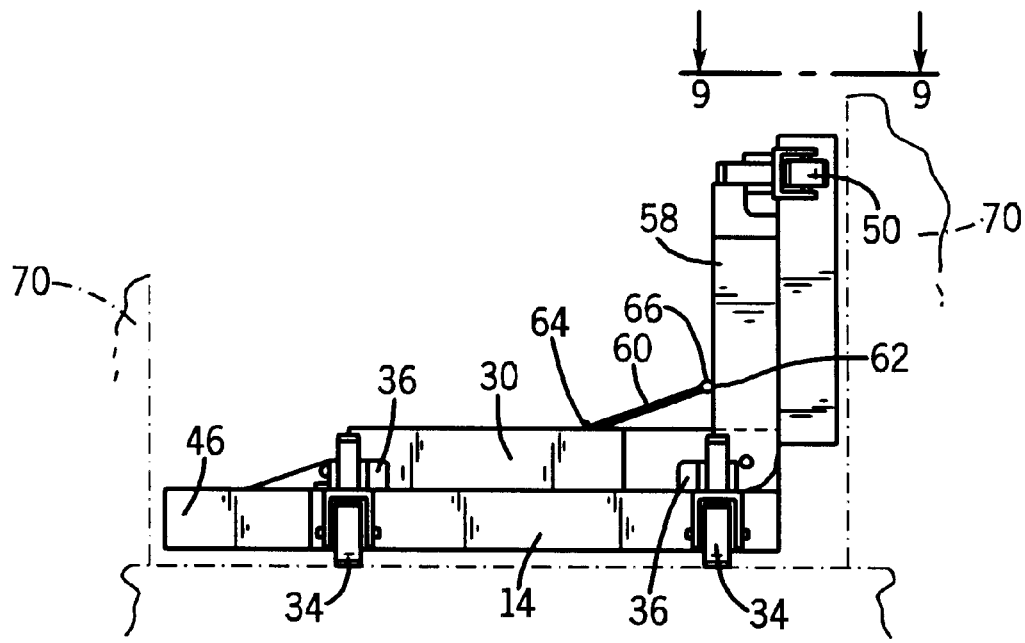
FIG. 4 is a front elevational view of the mower deck with the rotatable wing section in its vertical non-operating position.
Figure 5:
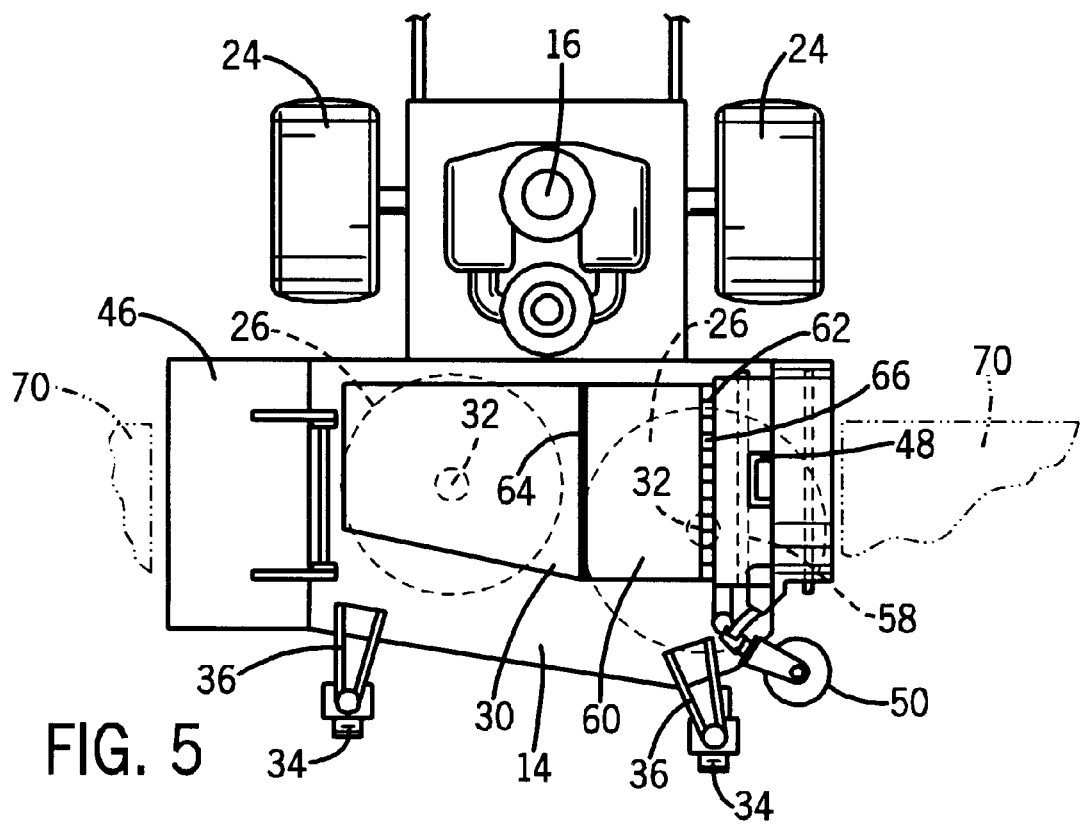
FIG. 5 is a top plan view of the lawn mower of FIG. 1 with the rotatable wing section of the mower deck in its vertical non-operating position.

Referring next to FIGS. 2–6, the mower deck 14 is shown in its substantially horizontal operating position, FIGS. 2 and 3, and its substantially vertical non-operating position, FIGS. 4 and 5. FIG. 6 shows the lawn mower 10 with the rotatable wing section 44 in its vertical nonoperating position. The rotatable wing section 44 is preferably pivotally attached to the side of the mower deck 14 opposite the cowling 46. The wing section 44 includes a cutter blade 54 attached to a vertical shaft 56 which is coupled to the belt and pulley assembly 28. The belt and pulley assembly 28 extends from above the main mower deck 14 above the wing section 44. The wing section 44 has its own cover assembly 58 for covering the belt and pulley assembly 28 driving the cutter blade 54.

The mower 10 further includes a sliding cover 60 with a first side 62 hingedly attached to the cover assembly 58 of the wing section 44 and a second side 64 resting on top of the cover assembly 58 of the main mower deck 14 extends between the cover assemblies of the wing section 44 and the main mower deck 14 for covering the belt and pulley assembly 28 between the main mower deck 14 and the wing section 44. The first side 62 of the cover 60 is pivotally hinged with a hinge 66 to the top surface of the cover assembly 58, so that when the wing section 44 is raised or lowered, the second side 64 of the cover 60 merely slides across the top surface of the cover assembly 30 covering the main mower deck 14. The second side of the cover is preferably curled so that it does not scratch the cover assembly 30 when sliding across its top surface.

The wing section 44 is rotated only when the cutter blades 26, 54 are not being driven by the engine 16. To ensure this, a safety interlock switch 68, FIG. 7, is provided which disengages the engine 16 from the cutter blades 26, 54 whenever the wing section 44 is not in the secured horizontal operating position. The safety interlock 68 is provided to prevent the cutter blades 26, 54 from being driven by the engine 16 when the wing section 44 is in the upright position. The cutting blades 26, 54 are automatically disengaged from the engine 16 when the wing section 44 is raised from its normal substantially horizontal operating position.

The wing section 44 is usually only rotated into a vertical non-operating position when maneuvering the mower through a narrow gate or passageway of an enclosed or fenced-in mowing area. The wing section 44 is manually rotated upwardly into the vertical position, as shown in FIGS. 4 and 5, so that the effective width of the mower deck 14 is no greater than the outside distance between the two rear drive wheels 24. After passing through the narrow gate or passageway as demonstrated by sections 70, the wing section 44 may be manually rotated downwardly from its substantially perpendicular orientation to its normal horizontal operating position. The wing section 44 is secured in the horizontal mowing position and the vertical nonoperating position by a locking mechanism 72 built into the frame members of the mower deck 14 and the wing section 44.

Referring next to FIGS. 7 and 8, the mower deck 14 includes a manually operated locking mechanism 72 for pivotally rotating and securing the rotatable wing section 44 from its substantially horizontal operating position to its substantially vertical non-operating position, and vice-versa. The locking mechanism 72 includes at least one apertured frame member 74 attached to the top of the mower deck 14. The frame member 74 is preferably part of the cover assembly 30 on top of the mower deck 14. The frame member 74 preferably includes at least two holes or apertures 76 formed therein for accepting a locking pin 78 to secure the wing section 44 in a first substantially horizontal position and a second substantially vertical position. The locking pin 78 is mounted to a link member 80 attached to the top of the wing section 44. The link member 80 is preferably part of the cover assembly 58 on top of the wing section 44. The link member 80 is pivotally fastened to the frame member 74 at a pivot point 82 for rotation of the rotatable wing section 44 about the pivot point 82. The pivot point 82 is preferably a fastener which attaches the link member 80 to the frame member 74. In the most preferred embodiment, the wing section 44 includes two link members 80 pivotally fastened to two frame members 74 on the mower deck 14 at pivot points 82 along a longitudinal axis of rotation 84.

The locking pin includes a first end 86 for insertion into the apertures 76 and a second end 88 having a head attached thereto for manual engagement and disengagement of the locking pin 78 by an operator. The locking pin 78 is spring loaded by a helical spring 90 surrounding the shaft 92 of the pin 78 so that the pin 78 will snap into the apertures 76 formed in the frame member 74. The shaft 92 and spring 90 are enclosed within a cylindrical member 94 extending radially outwardly from the link member 80. The locking pin 78 is spring biased for movement toward a pin-engaging position. Therefore, the spring 90 urges the first end 86 of the pin 78 toward the surface of the frame member 74 and into the apertures 76 formed therein.

The locking pin 78 secures the wing section 44 in the substantially horizontal operating position and the substantially vertical non-operating position. In order to raise the wing section 44 from its horizontal position, an operator must first disengage the locking pin 78 from the first aperture 76 by pulling the head 88 of the pin 78 outwardly and raising the wing section 44 by pulling upwardly on the handle 48. The wing section 44 may be secured in the vertical position by the first end 86 of the pin 78 engaging the second aperture 76 in the frame member. As the wing section is raised, the first end 86 of the pin 78 contacts the outer surface of the frame member 74 against the biasing force of the spring 90 until it is aligned with the aperture 76 in the frame member 74 whereby the force of the spring 90 urges the first end 86 of the pin 78 into locking engagement with the frame member aperture 76. The wing section 44 is manually rotated downwardly from the vertical position to the horizontal position in a similar manner.

FIG. 9 illustrates the swing-away caster wheel 50 attached to the front of the wing section 44. The caster wheel 50 may be rotated away from the bottom of the wing section 44 when the wing section 44 is in the vertical position. Normally, the caster wheel 50 extends down past the bottom of the wing section 44 in ground engaging position, as shown by the dotted-line image in FIG. 9. When the wing section 44 is rotated upwardly to the vertical position, the caster wheel 50 still extends past the bottom of the wing section 44. Thus, it is preferable for the caster wheel 50 to be rotated upwardly to a retracted position away from the bottom of the wing section 44 in order to provide maximum clearance when traveling through a narrow passageway, as shown by the solid-line image in FIG. 9.

The wheel 50 is secured in its ground engaging position and in its retracted position by a pin assembly 96. The pin assembly includes a pin 98 extending through a pair of apertures 100 formed in a fixed bracket 102 attached to the front of the wing section 44, and through another pair of apertures 104 formed in a rotatable bracket 106 connected to the wheel 50. The pin 98 is preferably held in place by a fastener 110, such as a cotter pin attached to the end of the pin. The wheel 50 rotates about a pivot point 108, such as a rod or bolt 112 extending through apertures 114 formed in the fixed bracket 102 and the rotatable bracket 106. To rotate the wheel 50, the pin 98 is removed, the wheel 50 is rotated upwardly, and the pin is re-inserted into the apertures 100 in the fixed bracket 102. The pin 98 rests against one side of the rotatable bracket 106 to prevent the wheel 50 from returning to a ground engaging position.

While the invention has been described with reference to preferred embodiments, those skilled in the art will appreciate that certain substitutions, alterations, and omissions may be made without departing from the spirit of the invention. Accordingly, the foregoing description is meant to be exemplary only and should not limit the scope of the invention set forth in the following claims.

What is claimed is:

1. A lawn mower comprising:
   a frame;
   a fixed mower deck with an engine mounted thereto for powering a plurality of cutting blades mounted within the mower deck and at least two rear drive wheels rotationally mounted to the frame;
   a handle bar assembly attached to and extending rearwardly and upwardly from the frame for controlling operation of the mower;
   at least one rotatable mower deck pivotally attached to one side of the fixed mower deck for movement between a substantially horizontal operating position and a substantially vertical non-operating position; and
   wherein the mower decks include a locking mechanism for manually securing the rotatable mower deck in the substantially horizontal operating position and the substantially vertical non-operating position.

2. The lawn mower of claim 1 wherein the rotatable mower deck includes at least one cutting blade mounted therein and coupled to the engine.

3. The lawn mower of claim 1 wherein the frame includes a front section and a rear section, with the fixed mower deck attached to the front section of the frame and the engine mounted to the rear section of the frame.

4. The lawn mower of claim 1 wherein the handle bar assembly includes a plurality of operator controls mounted to an operator console attached to the handle bar assembly for controlling operation of the engine, the fixed and rotatable mower decks, and the rear drive wheels.

5. The lawn mower of claim 1 further comprising at least one ground engaging caster wheel mounted forward of the fixed mower deck by a bracket assembly attached to the fixed mower deck.

6. The lawn mower of claim 1 wherein power is applied from the engine to the rear drive wheels through a hydrostatic drive system.

7. The lawn mower of claim 2 wherein power is applied from the engine to the cutting blades through a belt and pulley assembly located above the mower decks under a cover assembly.

8. The lawn mower of claim 1 wherein the rotatable mower deck includes a handle attached thereto for manually rotating the rotatable mower deck between the substantially horizontal operating position and the substantially vertical non-operating position.

9. The lawn mower of claim 1 wherein the rotatable mower deck includes at least one rotatable support wheel mounted forward of the rotatable mower deck by a bracket assembly for rotation between a deployed ground engaging position when the rotatable mower deck is in the substantially horizontal operating position and a retracted position when the rotatable mower deck is in the substantially vertical non-operating position.

10. The lawn mower of claim 9 wherein the rotatable support wheel includes a pin assembly for locking the wheel in the deployed ground engaging position and the retracted position.

11. A lawn mower comprising:
a frame having a front section and a rear section;
a mower deck attached to the front section of the frame and an engine mounted to the rear section of the frame for powering a plurality of cutting blades mounted within the mower deck and a pair of rear drive wheels rotationally mounted to the rear section of the frame;
a handle bar assembly attached to and extending rearwardly and upwardly from the rear section of the frame for controlling operation of the mower;
at least one rotatable wing section pivotally attached to one side of the mower deck for movement between a substantially horizontal operating position and a substantially vertical non-operating position;
wherein the mower deck includes a locking mechanism for securing the rotatable wing section in the substantially horizontal operating position and the substantially vertical non-operating position;
wherein the locking mechanism includes a pin assembly attached to a link member attached to the wing section which is pivotally connected to a frame member attached to the mower deck; and
wherein the frame member includes at least two apertures formed therein for accepting a spring biased pin from the pin assembly for securing the wing section in a first position and a second position, corresponding to the apertures.

12. A lawn mower comprising:
a frame having a front section and a rear section;
a mower deck attached to the front section of the frame and an engine mounted to the rear section of the frame for powering a plurality of cutting blades mounted within the mower deck and a pair of rear drive wheels rotationally mounted to the rear section of the frame;
a handle bar assembly attached to and extending rearwardly and upwardly from the rear section of the frame for controlling operation of the mower;
at least one rotatable wing section pivotally attached to one side of the mower deck for movement between a substantially horizontal operating position and a substantially vertical non-operating position; and
wherein the mower deck and rotatable wing section include a locking mechanism for manually securing the rotatable wing section in the substantially horizontal operating position and the substantially vertical non-operating position.

13. The lawn mower of claim 12 wherein the rotatable wing section includes at least one cutting blade mounted therein and coupled to the engine.

14. The lawn mower of claim 12 wherein the wing section includes a handle attached thereto for manually rotating the wing section between the substantially horizontal operating position and the substantially vertical non-operating position.

15. The lawn mower of claim 12 wherein the locking mechanism includes a pin assembly attached to a link member attached to the wing section which is pivotally connected to a frame member attached to the mower deck.

16. The lawn mower of claim 12 wherein the wing section includes at least one rotatable support wheel mounted forward of the wing section by a bracket assembly for rotation between a deployed ground engaging position when the rotatable wing section is in the substantially horizontal operating position and a retracted position when the rotatable wing section is in the substantially vertical non-operating position.

17. The lawn mower of claim 16, wherein the rotatable support wheel includes a pin assembly for locking the wheel in the deployed ground engaging position and the retracted position.

18. A self-propelled, walk-behind lawn mower comprising:
a frame having a front section and a rear section;
a first mower deck attached to the front section of the frame and an engine mounted to the rear section of the frame for powering a plurality of cutting blades mounted within the mower deck and a pair of rear drive wheels rotationally mounted to the rear section of the frame;
a handle bar assembly attached to and extending rearwardly and upwardly from the rear section of the frame for controlling operation of the mower;
a second mower deck pivotally attached to one side of the first mower deck for rotational movement between a substantially horizontal operating position and a substantially vertical non-operating position, the engine powering at least one cutting blade mounted within the second mower deck; and
wherein the first and second mower decks include a locking mechanism for manually securing the second mower deck in the substantially horizontal operating position and the substantially vertical non-operating position.

19. The lawn mower of claim 18 wherein the second mower deck includes a rotatable support wheel attached to the front of the second mower deck for rotation between a deployed ground engaging position when the second mower deck is in the substantially horizontal operating position and a retracted position when the second mower deck is in the substantially vertical non-operating position.

20. The lawn mower of claim 19 wherein the rotatable support wheel includes a pin assembly for locking the wheel in the deployed ground engaging position and the retracted position.

* * * * *